(12) United States Patent
Tanaka

(10) Patent No.: US 6,762,398 B1
(45) Date of Patent: Jul. 13, 2004

(54) IMAGING DEVICE WITH FIXED-PATTERN-NOISE CORRECTION REGULATED CONSTANT-CURRENT SOURCE

(75) Inventor: Akio Tanaka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/192,474

(22) Filed: Nov. 17, 1998

(30) Foreign Application Priority Data

Nov. 17, 1997 (JP) ............................................. 9-315455

(51) Int. Cl.$^7$ ............................................. H01L 27/00
(52) U.S. Cl. ................................. 250/208.1; 348/241
(58) Field of Search ...................... 250/208.1, 214 R, 250/370.08, 338.1; 348/241, 302, 304, 307, 308, 303

(56) References Cited

U.S. PATENT DOCUMENTS

| | | | |
|---|---|---|---|
| 4,274,113 A | | 6/1981 | Ohba et al. |
| 4,317,134 A | | 2/1982 | Woo et al. |
| 4,333,111 A | * | 6/1982 | Noda et al. ................. 348/241 |
| 4,379,232 A | | 4/1983 | Hopper |
| 4,463,383 A | * | 7/1984 | Soneda et al. ............... 348/300 |
| 4,507,684 A | | 3/1985 | Battson |
| 4,539,536 A | | 9/1985 | White |
| 4,577,231 A | | 3/1986 | Ohba et al. |
| 4,580,051 A | | 4/1986 | Tew |
| 4,740,908 A | | 4/1988 | Berger et al. |
| 5,990,951 A | * | 11/1999 | Koyama ..................... 348/302 |
| 6,037,577 A | * | 3/2000 | Tanaka et al. ............ 250/208.1 |

FOREIGN PATENT DOCUMENTS

| | | |
|---|---|---|
| JP | 1-289381 | 11/1989 |
| JP | 6-78218 | 3/1994 |
| JP | 8-242330 | 9/1996 |
| JP | 9-284652 | 10/1997 |
| JP | 10-304251 | 11/1998 |

* cited by examiner

Primary Examiner—Thanh X. Luu
(74) Attorney, Agent, or Firm—McGinn & Gibb, PLLC

(57) ABSTRACT

An imaging device includes a plurality of detectors for converting an electromagnetic radiation into electric signals, a first regulated constant-current source for supplying a constant bias current to the detectors, and a second regulated constant-current source connected to the first regulated constant-current source, for correcting variations of the detectors. The second regulated constant-current source is effective for correcting variations of pixels due to variations of amplifying elements.

24 Claims, 9 Drawing Sheets

IMAGING DEVICE WITH FIXED-PATTERN-NOISE CORRECTION REGULATED CONSTANT-CURRENT SOURCE

BACKGROUND OF THE INVENTION

1. Field of the Invention

The present invention relates to an imaging device for converting an electromagnetic radiation such as visible light, infrared rays, ultraviolet rays, X-rays, etc. into an electric signal, and more particularly to an infrared imaging device for converting infrared rays into an electric signal.

2. Description of the Related Art

Infrared imaging devices are classified into a quantum type which detects incident infrared rays with a photodiode or the like and a thermal type which converts an increase in temperature of a structural body due to incident infrared rays into an electric signal with a thermoelectric transducer. Both types of infrared imaging devices are used to measure a temperature distribution over the surface of a subject to be imaged, for example.

One conventional infrared imaging device is disclosed in Japanese patent application No. 098009/96, for example, which is an earlier invention by the inventor of the present invention. FIGS. 1 and 2 of the accompanying drawings are a cross-sectional view and a circuit diagram, respectively, of the disclosed conventional infrared imaging device. The conventional infrared imaging device is a thermal-type infrared imaging device. As shown in FIG. 1, the infrared imaging device has a semiconductor substrate 20, a scanning circuit 21 on the surface of the semiconductor substrate 20, and a photodetector on the scanning circuit 21 for converting incident infrared rays into an electric signal. The scanning circuit 21 and the photodetector comprise an integrated matrix of pixels for generating a signal representing a two-dimensional infrared image. The photodetector comprises an infrared absorbing layer 29 for absorbing infrared rays, a diaphragm (silicon oxide film) 28 for preventing heat from being dissipated away, and a thermoelectric transducer 27 for converting heat into an electric signal.

The diaphragm 28 has its lower layer removed by etching, so that it is of a floating film-like structure. The thermoelectric transducer 27 comprises a bolometer whose electric resistance varies depending on the temperature, the bolometer being made of titanium. An infrared ray applied to each of the pixels is absorbed by the infrared absorbing layer 29 at each pixel, increasing the temperature of the diaphragm 28 at each pixel. The increase in the temperature is converted into an electric signal by the titanium bolometer. Electric signals generated by the respective pixels are successively read by the scanning circuit 21.

The infrared imaging device also has a silicon oxide film 22, cavities 23, ground lines 24, signal lines 25, and vertical selection lines 30.

As shown in FIG. 2, the scanning circuit 21 of the infrared imaging device has source followers 907, 912, load transistors 913, horizontal switches 909, 916, horizontal signal lines 911, NPN transistors 902, PNP transistors 904, integrating capacitors 905, ramp waveform generators 915, pixel switches 920, horizontal signal lines 918, titanium bolometers 901, 903, level converters 921, 922, 923, 924, 925, 926, 927, 927 for being supplied respectively with horizontal data 929, a horizontal clock 930, an S/H pulse 931, a reset pulse 932, horizontal data 933, a horizontal clock 934, vertical data 935, and a vertical clock 936, a horizontal shift register 910 for outputting horizontal pulses I1–I5, a horizontal shift register 917 for outputting horizontal selection signals H1–H128, and a vertical shift register 919 for outputting vertical selection signals V1–V128.

In FIG. 2, each of the titanium bolometers 901 is disposed on the corresponding diaphragm 28, and is sensitive to incident infrared rays. When a voltage $V_{b1}$ is applied to the base of an NPN transistor 902, a voltage $(V_{b1}-V_{BE})$ is applied to the titanium bolometer 901 where $V_{BE}$ represents a base-to-emitter voltage of the NPN transistor 902. If the titanium bolometer 901 has a resistance $R_{b1}$, then a current $I_{c1}=(V_{b1}-V_{BE})/R_{b1}$ flows through the collector of the NPN transistor 902.

The titanium bolometers 903 are disposed on the semiconductor substrate 20, and hence are not sensitive to incident infrared rays. This is because the titanium bolometers 903 are used as a reference with respect to the titanium bolometers 901. When a voltage $V_{b2}$ is applied to the base of an NPN transistor 904, a current $I_{c2}=(V_{b2}-V_{BE})/R_{b2}$ flows through the collector of the NPN transistor 904 where $R_{b2}$ represents the resistance of the titanium bolometer 903.

When no incident infrared ray is applied, the currents $I_{c1}$, $I_{c2}$ are in equilibrium with each other, and almost no current flows in the integrating capacitor 905. When an incident infrared ray is applied, the temperature of the thermally isolated diaphragm 28 rises, changing the resistance of the titanium bolometer 901 on the diaphragm 28. The change in the resistance of the titanium bolometer 901 changes the current $I_{c1}$. Since the resistance of the titanium bolometer 903 on the semiconductor substrate 20 does not change, the current $I_{c2}$ does not change. Because of the changing current $I_{c1}$, there is developed a current difference $\Delta I=(I_{c2}-I_{c1})$ which is stored in the integrating capacitor 905. The current difference $\Delta I$ comprises a signal component and a bias component which cannot be removed, with a larger bias component being removed.

Another conventional imaging device is an amplification-type solid-state imaging device as disclosed in Japanese laid-open patent publication No. 289381/89, for example. The amplification-type solid-state imaging device disclosed has a photodiode and a current mirror that are combined with each other for reducing the effects of the threshold voltage VT and parasitic capacitance of an amplifying element.

Japanese laid-open patent publication No. 78218/94 reveals an imaging device in which the difference between an output signal produced by a pixel when a reset time is long and an output signal produced by the pixel when the reset time is short is determined to remove fixed pattern noise (FPN).

In an imaging device disclosed in Japanese laid-open patent publication No. 242330/96, the difference between an output signal produced by a pixel immediately before the signal is reset and an output signal produced by the pixel immediately after the signal reset is determined to correct signal variations of a reading circuit.

The imaging device shown in Japanese laid-open patent publication No. 098009/96 is capable of cutting off a larger bias component and extracting a signal component, but cannot increase the amplification for signals if there are large variations between the pixels.

In imaging devices composed of a plurality of pixels, there are usually variations between the pixels. These variations between the pixels may be caused by variation between detectors such as bolometers or variations in threshold voltages and parasitic capacitances of amplifying elements. In a bolometer-type infrared imaging device, for example, bolometer resistances vary from several percentages to several tens of percentages due to variations of the thickness of bolometer films, variations of specific resistances, and variations of patterned dimensions.

Such pixel variations may pose a serious problem in reading signals. For example, when a subject having a temperature difference of 1° C. is imaged, the temperature of the bolometer temperature changes by about 1 m° C., and the resistance of the bolometer changes by about 0.001% if the temperature coefficient of resistance of the bolometer is 1%/° C. In order to read such a small resistance change, it should preferably be amplified by an amplifying circuit. If there are large resistance variations between the pixels, however, the dynamic range of the amplifying circuit is limited by the large resistance variations, and the amplification factor of the amplifying circuit cannot be increased.

The amplification-type solid-state imaging devices disclosed in Japanese laid-open patent publications Nos. 289381/89, 78218/94, and 242330/96 are only effective to correct variations contained in amplifying elements, such as parasitic capacitance and threshold voltage variations, and do not correct variations of detectors themselves.

SUMMARY OF THE INVENTION

It is therefore an object of the present invention to provide an imaging device which is capable of correcting variations between pixels due to variations inherent in detectors and amplifying elements to allow signals to be amplified smoothly in an imaging unit and to be processed smoothly outside of an imaging unit.

According to the present invention, there is provided an imaging device comprising a reading circuit which includes a first regulated constant-current source for supplying a constant bias current to detectors that convert electromagnetic radiation into electric signal, and a second regulated constant-current source connected to the first regulated constant-current source, for correcting variations of the detectors.

The second regulated constant-current source is capable of correcting variations of pixels due to variations of amplifying elements and variations inherent to the detectors, with the result that the amplification factor of an amplifying circuit on a chip can be increased.

The first regulated constant-current source may comprise a bipolar transistor having an emitter connected to the detectors and a collector connected to the second regulated constant-current source, or a field-effect transistor having a source connected to the detectors and a drain connected to the second regulated constant-current source.

The second regulated constant-current source may comprise a bipolar transistor and a resistor connected to an emitter of the bipolar transistor, or a field-effect transistor and a resistor connected to a source of the field-effect transistor.

With the second regulated constant-current source, the amplification factor of the transistor is lowered to make noise of the transistor smaller in an outputted constant current.

If the resistor has the same temperature coefficient as the detectors, then the regulated constant-current circuit is the same as the temperature coefficient of the detectors, resulting in a reduction in temperature drifts.

The second regulated constant-current source may comprise a plurality of bipolar transistors and a plurality of resistors connected to emitters of the bipolar transistors, each of the resistors having a resistance inversely proportional to an area of the emitter of one of the bipolar transistors, or a plurality of field-effect transistors and a plurality of resistors connected to sources of the field-effect transistors, each of the resistors having a resistance inversely proportional to a gate length of one of the field-effect transistors. Since voltages applied to the resistors are equal and highly accurate, variations of the pixels can be corrected highly accurately.

The resistance ranges from 1 kΩ to 500 kΩ, and preferably from 5 kΩ to 100 kΩ. Therefore, Johnson noise can be reduced without increasing the breakdown voltage of the imaging device.

The imaging circuit may further comprise two data buffers for storing variation data of the detectors. The data buffers allow correction data to be read into the imaging device while signals of the pixels are being integrated, so that the period of time for integrating the signals can be increased to reduce noise.

The imaging circuit may further comprise means for comparing signals from pixels of the detectors with an upper or lower limit of a dynamic range of the reading circuit, means for generating variation data of the detectors based on the result of the comparison, and means for manipulating a most significant bit (MSB) of each of the variation data of the detectors to determine a value of the MSB based on the result of the comparison, and successively manipulating bits of the variation data of the detectors to determine values of the bits up to a least significant bit thereof.

With the above arrangement, it is possible to acquire correction data for correcting the variations of the pixels easily in a short period of time. This is because of the use of an algorithm for searching for bits of the correction data while monitoring the dynamic range of the signals.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
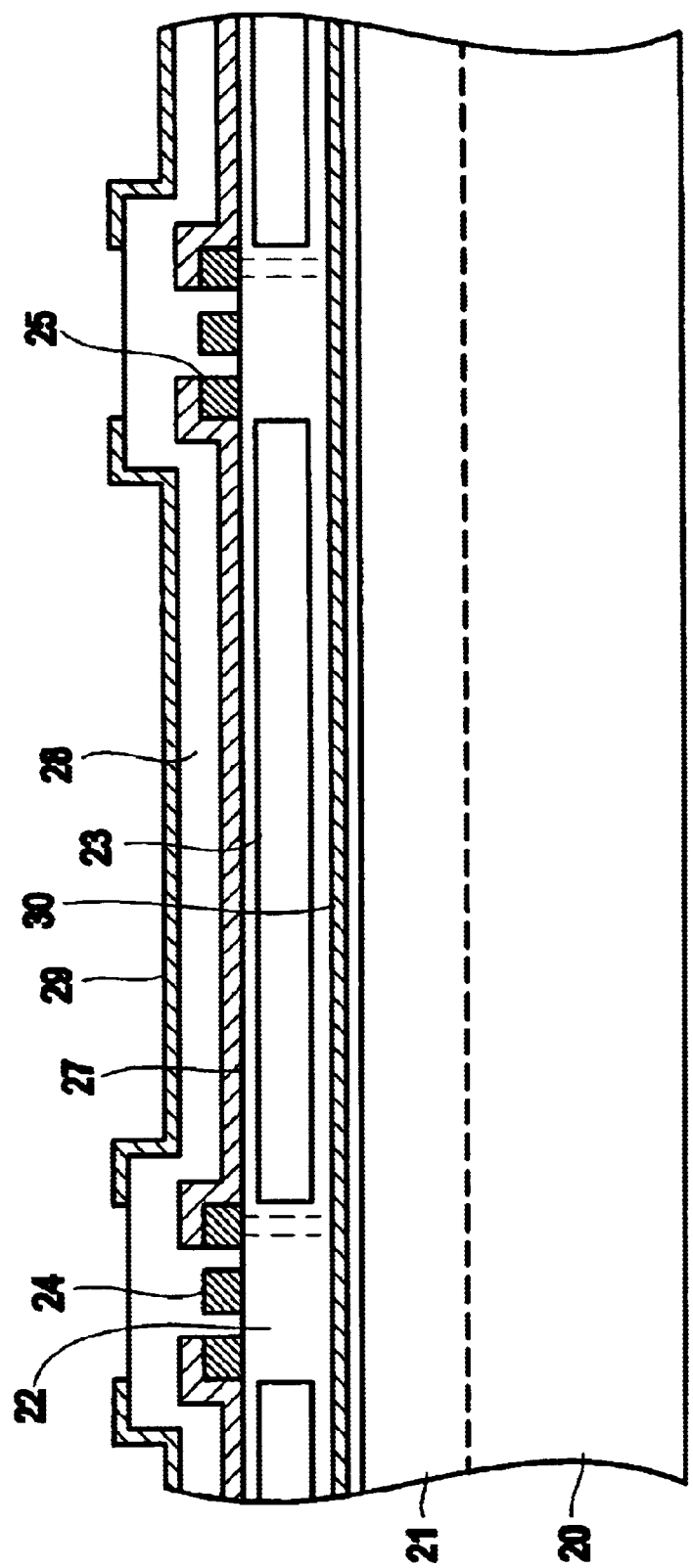
FIG. 1 is a fragmentary cross-sectional view of a conventional imaging device.
Figure 2:
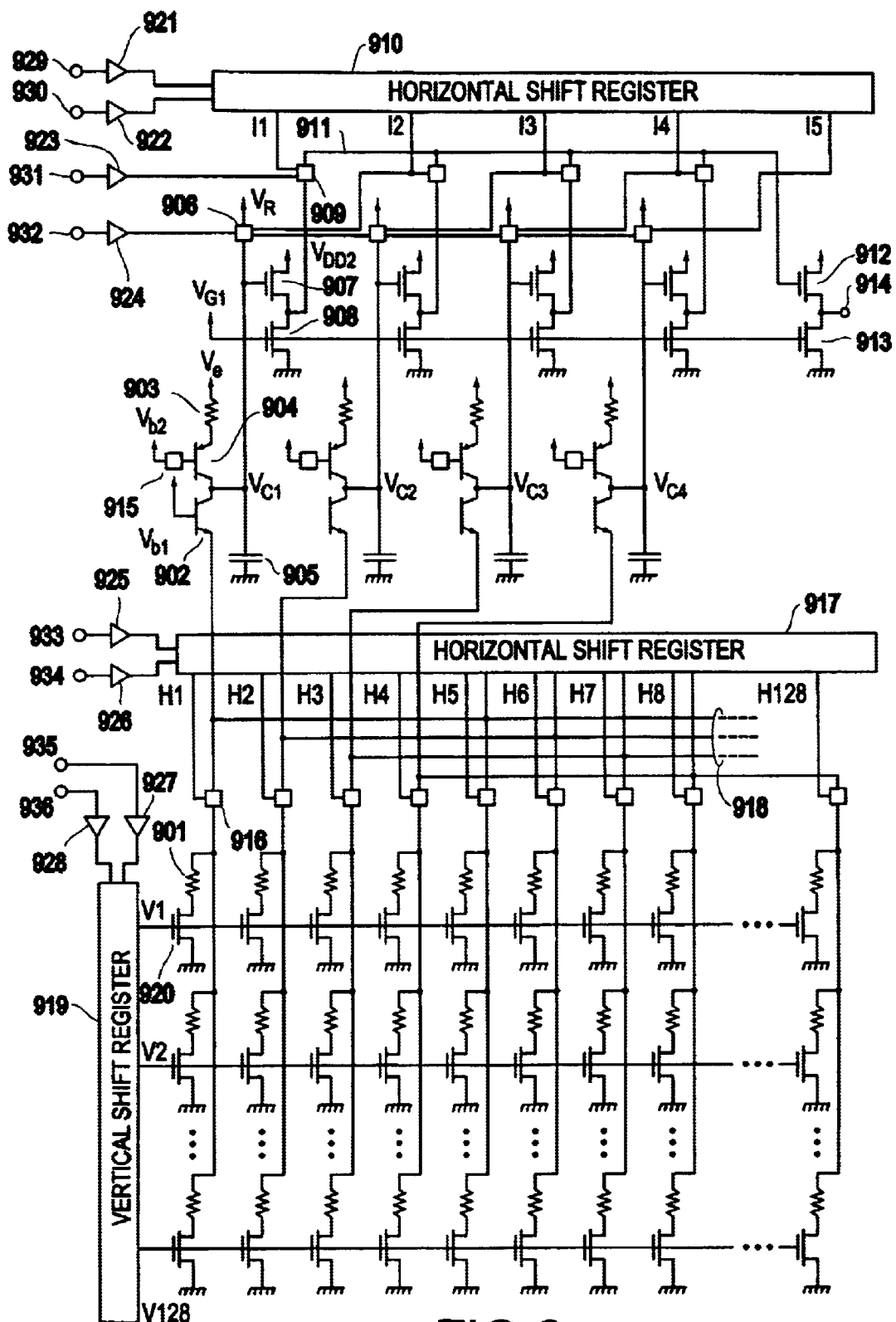
FIG. 2 is a circuit diagram of the imaging device shown in FIG. 1.
Figure 3A:
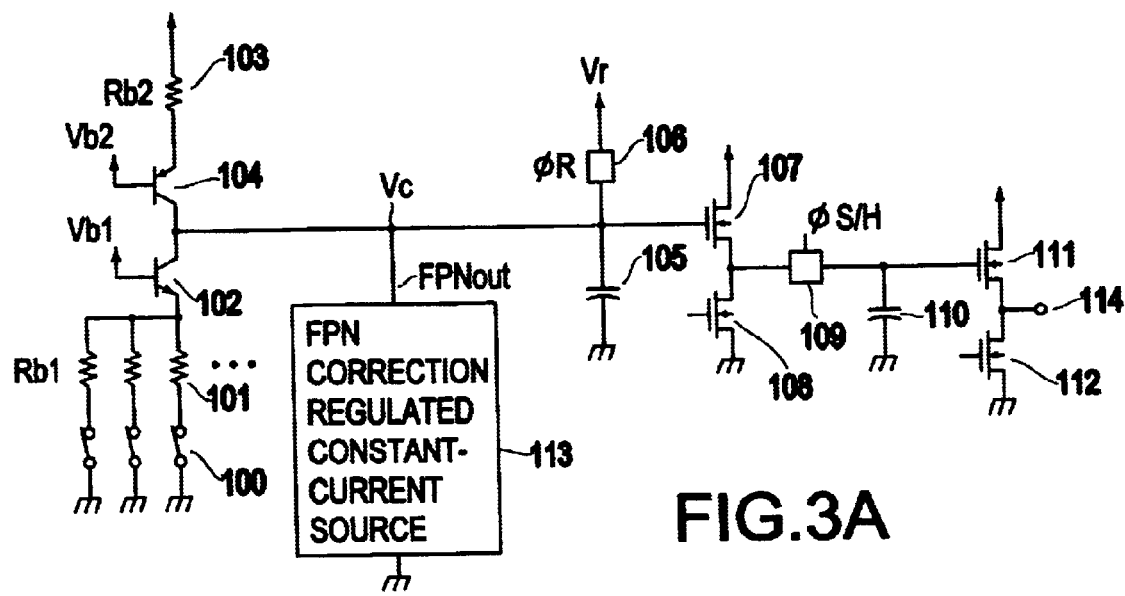
FIG. 3A is a circuit diagram of a reading circuit of an imaging device according to an embodiment of the present invention.

As shown in FIG. 3A, a reading circuit of an image device according to an embodiment of the present invention comprises a plurality of thermoelectric transducers 101, an NPN transistor 102 serving as a first regulated constant-current source, a resistor 103, a PNP transistor 104 serving as a third regulated constant-current source, a plurality of switches 100, an FPN correction regulated constant-current source 113 serving as a second regulated constant-current source, an integrating capacitor 105, and a reset switch 106. Each of the thermoelectric transducers 101 comprises a bolometer disposed on a diaphragm, and is sensitive to incident infrared rays. As described later on, the thermoelectric transducers 101 are arranged as a linear array or a two-dimensional matrix on a substrate, and are successively selected by the switches 100.

When a voltage $V_{b1}$ is applied to the base of the NPN transistor 102, a voltage $(V_{b1}-V_{BE})$ is applied to a thermoelectric transducer 101 where $V_{BE}$ represents a base-to-emitter voltage of the NPN transistor 102. If the thermoelectric transducer 101 has a resistance $R_{b1}$, then a current $I_{c1}=(V_{b1}-V_{BE})/R_{b1}$ flows through the collector of the NPN transistor 102.

When a voltage $V_{b2}$ is applied to the base of the PNP transistor 104, a current $I_{c2}=(V_{b2}-V_{BE})/R_{b2}$ flows through the collector of the PNP transistor 104 where $R_{b2}$ represents the resistance of the resistor 103. The currents $I_{c1}$, $I_{c2}$ are in substantial equilibrium with each other, and a very small current difference $\Delta I=(I_{c2}-I^{c1})$ flows into the integrating capacitor 105. The current difference $\Delta I$ comprises a signal component and a bias component which cannot be removed, with a larger bias component being removed.

When an incident infrared ray is applied, the temperature of the thermally isolated diaphragm rises, changing the resistance of the thermoelectric transducer 101 (the bolometer) on the diaphragm. The change in the resistance of the thermoelectric transducer 101 changes the current $I_{c1}$, and the change in the current $I_{c1}$ is stored in the integrating capacitor 105.

The bias component which cannot be removed is caused by variations between the thermoelectric transducers 101 that are successively selected. Since the resistance $R_{b2}$ is fixed, the difference $\Delta I$ suffers variations if there are large variations between the resistances $R_{b1}$. The FPN correction regulated constant-current source 113 is a regulated constant-current source for correcting such variations. The FPN correction regulated constant-current source 113 has a circuit arrangement as shown in FIG. 3B.

Figure 3B:
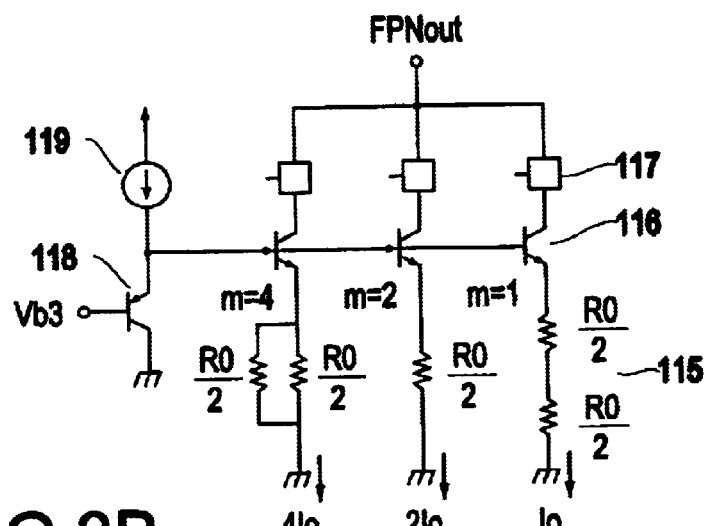
FIG. 3B is a circuit diagram of an FPN correction regulated constant-current source in the reading circuit shown in FIG. 3A.

As shown in FIG. 3B, the FPN correction regulated constant-current source 113 comprises a plurality of NPN transistors 116, a plurality of resistors 115 connected to the emitters of the NPN transistors 116, and a plurality of switches 117 connected to the collectors of the NPN transistors 116. The FPN correction regulated constant-current source 113 is composed of a plurality of regulated constant-current source stages, whose currents are weighted by integral multiples of 2, e.g., represented by $I_0$, $2I_0$, $4I_0$, .... In order to weight the currents with integral multiples of 2, the resistors 115 are weighted in inverse proportion to the currents, e.g., they have resistances $R_0$, $R_0/2$, $R_0/4$, .... To minimize any variations of resistances, the resistors 115 are provided by combinations of unit resistors whose resistance is $R_0/2$.

The NPN transistors 116 have respective emitter sizes (m) weighted in proportion to the currents, i.e., represented by m=1, m=2 (twice), m=4 (four times), ... where m=1 indicates the unit emitter size for the stage where the current $I_0$ flows. Depending on the variations between the resistances $R_{b1}$, the switches 117 are turned on and off to reduce the difference $\Delta I$. If the FPN correction regulated constant-current source 113 has n stages, then it can reduce the difference $\Delta I$ to $1/2^n$.

The emitter sizes (m) of the NPN transistors 116 are different for the following reasons: The relationship between the base current $I_B$ and the base-to-emitter voltage $V_{BE}$ is expressed by $$I_B = mIB_0 Exp[qV_{BE}/kT]$$

where $IB_0$ represents a reverse leakage current, q a unit charge, k the Boltzmann's constant, and T the absolute temperature. Since the base current is expressed by $I_B=I_c/\beta$ where $\beta$ is the current amplification factor, if the collector current changed with the emitter size m being constant, the base-to-emitter voltage $V_{BE}$ would also change. Because the same voltage $V_{b1}$ is applied to the bases of the transistors 116, if the base-to-emitter voltage $V_{BE}$ were different from state to state, the currents in the respective stages would not be established as described above. By changing the emitter size m depending on the current, the base-to-emitter voltages $V_{BE}$ in the respective stages become equal to each other, and currents in the respective stages can be established as described above.

The circuit arrangement shown in FIG. 3B in which the resistors 115 are connected to the emitters of the NPN transistors 116 is effective to reduce shot noise of the NPN transistors 116, Johnson noise of the base resistors (rbb) of the NPN transistors 116, and noise of the regulated constant-voltage source connected to the bases of the NPN transistors 116.

Figure 5:
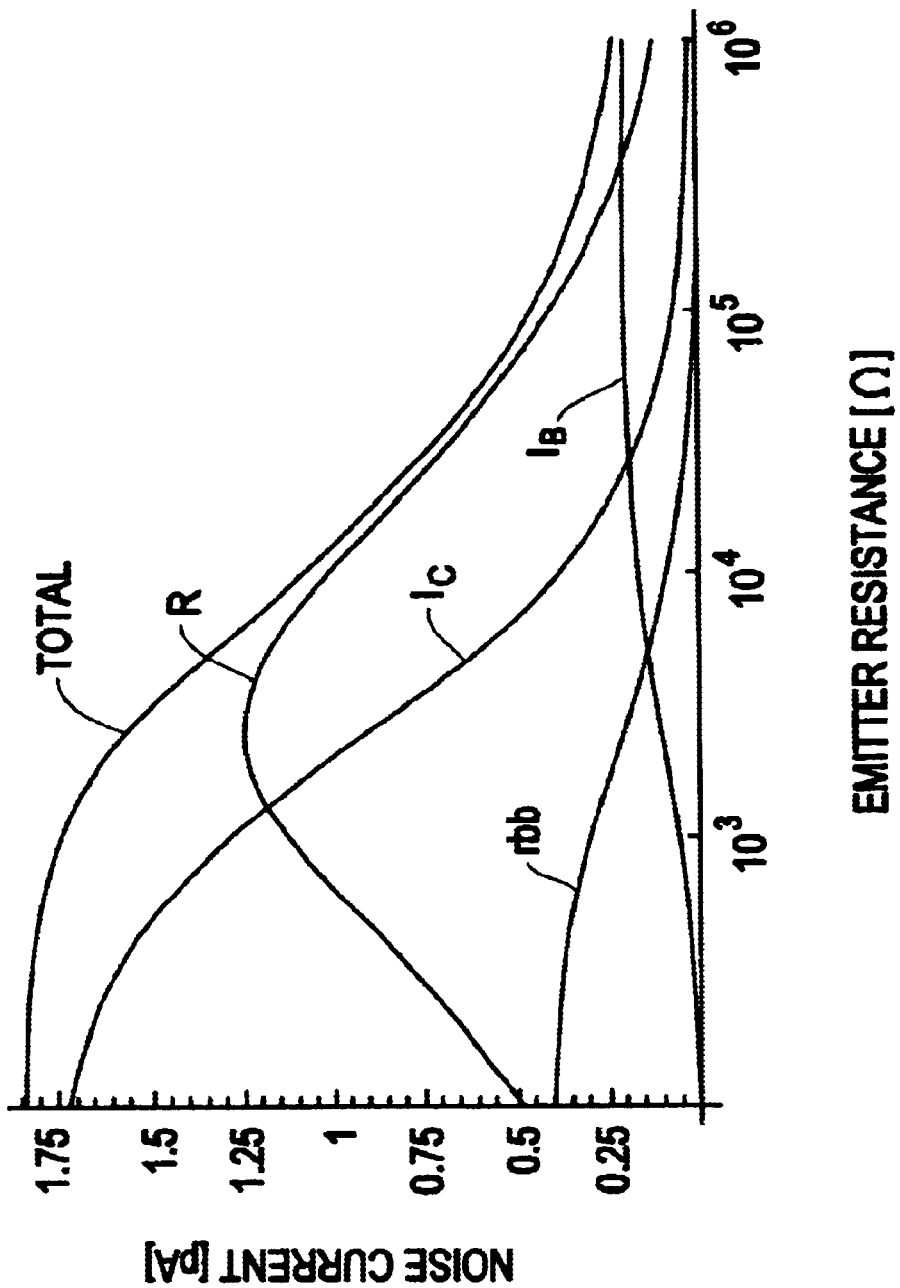
FIG. 5 is a graph showing current noise flowing through a collector when the resistance of an emitter is changed in the FPN correction regulated constant-current source shown in FIG. 3B.

FIG. 5 shows current noise flowing through a collector when the resistance of an emitter is changed in the FPN correction regulated constant-current source shown in FIG. 3B. In the graph shown in FIG. 5, R represents the Johnson noise of the resistor connected to the emitter, $I_C$ the shot noise of the collector current, $I_B$ the shot noise of the base current, rbb the Johnson noise of the base resistor, and Total the total noise. The values shown in FIG. 5 are obtained when the collector current is 10 $\mu A$ because the current usually flowing through a bolometer is about 100 $\mu A$ and, if bolometer resistance variations are about 10%, then the current produced by the correction current source is 10% of 100 $\mu A$, i.e., 10 $\mu A$.

The total noise can be reduced by increasing the emitter resistance. If the emitter resistance is increased to 1 K$\Omega$ or more, the total noise starts to decrease. If the emitter resistance is 5 K$\Omega$ or higher, the total noise is about 3 dB lower than if the emitter resistance is 1 K$\Omega$ or less. The value of 3 dB is a limit value at which the human eye can recognize the improved total noise. When the collector current is 10 $\mu A$, then the voltage across the emitter resistance is 5 V or lower if the emitter resistance is 500 k$\Omega$ or less, and can be handled by an ordinary BiCMOS circuit. If the emitter resistance is 100 k$\Omega$ or less, then the voltage across the emitter resistance is 1 V or less, providing a margin to the dynamic range of the circuit. Therefore, the emitter resistance should range from 1 k$\Omega$ to 500 k$\Omega$, preferably from 5 k$\Omega$ to 100 k$\Omega$.

The circuit arrangement shown in FIG. 3B in which the switches 117 are connected to the collectors of the NPN transistors 116 is preferable as it can reduce 1/f noise present in the switches and Johnson noise. This is because since the impedance of the NPN transistors 116 operating with a constant current is very high, current noise present in the switches 117 cannot easily be recognized. Therefore, the switches 117 may comprise MOSFETs having large 1/f noise. The MOSFETs are preferable as switches because they can easily be controlled to be turned on and off.

In order to reduce temperature drifts of the imaging device, it is necessary to reduce the temperature dependency of the currents $I_0$, $2 I_0$, $4 I_0$, . . . of the FPN correction regulated constant-current source 113. To meet this requirement, a base voltage $V_{b3}$ serving as a basis for the currents $I_0$, $2 I_0$, $4 I_0$, . . . is designed so as to be less temperature dependent. The base voltage $V_{b3}$ may be generated within or supplied from outside of the FPN correction regulated constant-current source 113. For reduced temperature dependency, however, it is preferable to use a regulated constant-voltage source having a very small temperature dependency property such as a band gap reference or the like for generating the base voltage $V_{b3}$. In infrared imaging device applications, such a regulated constant-voltage source may be formed on a chip for a constant temperature because the chip may be or kept at a normal temperature by a Peltier device.

A PNP transistor 118 and a regulated constant-current source 119 jointly make up an emitter follower. When the base voltage $V_{b3}$ is applied to the base of the emitter follower, the temperature dependency of the voltage $V_{BE}$ of the PNP transistor 118 and the temperature dependency of the voltage $V_{BE}$ of the NPN transistor 116 can be canceled. For keeping the chip at a constant temperature as described above, however, the emitter follower may be dispensed with, and the base voltage $V_{b3}$ may be applied directly to the base of the NPN transistor 116.

The difference $\Delta I$ which has been reduced to $1/2^n$ by the FPN correction regulated constant-current source 113 is stored in the integrating capacitor 105. Since the amount of electric charge to be stored in the integrating capacitor 105 can be reduced by the removal of the bias component and the correction of the FPN, the integrating capacitor 105 may be reduced in capacity and size.

For example, when the bias current $I_{c1}=200$ µA flows, a signal component generated when a subject having a temperature difference of 1° C. is imaged is of about 8 nA of the current (calculated on the assumption that the temperature rise of the diaphragm is 2 m° C. and the temperature coefficient of resistance of the bolometer is 2%/° C.). Even if a dynamic range of 100° C. is assumed, the signal component is of about 800 nA. Though such a small signal current may be stored in a very small integrating capacitor, there is actually a bias component that cannot be removed as described below. If the current $I_{c2}$ has a central designed value and the resistance $R_{b1}$ varies by 10%, then the bias component $\Delta I$ that cannot be removed is of about ±10 µA. If the bias component $\Delta I$ were to be stored directly in the integrating capacitor 105, then the integrating capacitor 105 would need to have a large capacity of 400 pF (calculated on the assumption that the integrating time is 100 µs and the dielectric strength of the capacitor is 5 V). If a three-stage regulated constant-current source is used as the FPN correction regulated constant-current source 113, then the bias component $\Delta I$ is reduced to 1/8, and the integrating capacitor 105 may have a capacity of 500 pF.

As shown in FIG. 3A, a signal stored in the integrating capacitor 105 is converted from a high impedance to a low impedance by a source follower comprising NMOSFETs 107, 108. A sample and hold circuit which comprises a switch 109 and a holding capacitor 110 samples a time-series signal and temporarily stores the sampled signal. The switch 109 comprises a transfer gate having PMOSFETs or NMOSFETs whose sources or drains are connected to each other. NMOSFETs 111, 112 jointly make up a source follower for outputting a sampled and held signal at a low impedance to an output terminal 114.

Figure 4:
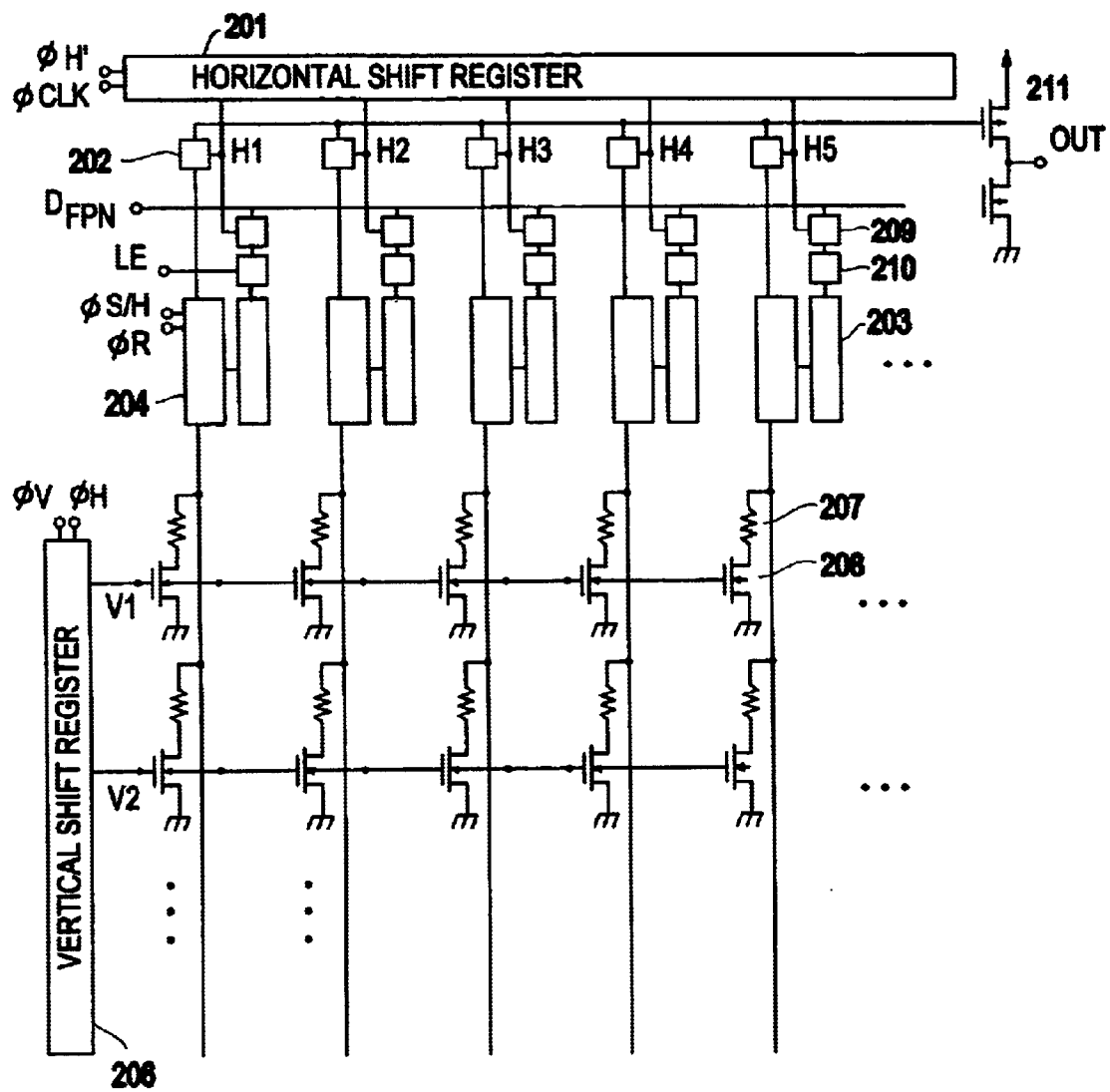
FIG. 4 is a circuit diagram, partly in block form, of the imaging device.

FIG. 4 shows the imaging device which includes reading circuits each shown in FIG. 3A and peripheral circuits. As shown in FIG. 4, the imaging device comprises a horizontal shift register 201, multiplexers 202, FPN correction regulated constant-current sources 203, reading circuits 204, horizontal switches 211, a vertical shift register 206, thermoelectric transducers 207, pixel switches 208, FPN data buffers 209, and FPN data buffers 210.

The thermoelectric transducers 207 are arranged as a two-dimensional matrix on a substrate, and are successively selected by the switches 208. Signals generated by the thermoelectric transducers 207 are read by the reading circuits 204 that are associated with respective columns of the matrix. The fabrication of the reading circuits 204 depends upon the following trade-offs:

The reading circuits 204 associated with the respective columns of the matrix can increase a period of time for reading signals because the signals can be read simultaneously from the columns. Since the period of time for reading signals can be increased, the noise band of the signals can be reduced, resulting in a reduction in the noise. On the other hand, since many reading circuits are required, the chip area needs to be increased.

If a single reading circuit is shared by a plurality of columns, the number of reading circuits used can be reduced, and the chip area may be reduced. On the other hand, because the reading circuit is shared by the columns according to time division, the period of time for reading signals is reduced, resulting in an increase in the noise band.

The vertical shift register 206 successively selects the rows of the matrix.

Data for correcting FPN to be supplied to the FPN correction regulated constant-current sources 203 are stored for all pixels in a memory not on the chip. While reading circuits 204 associated with the respective columns of the matrix are effecting a reading operation such as an integrating process, the FPN data buffers 210 store FPN data of pixels being read. Since it is necessary to increase the period of time for reading signals, such as integrating signals, for noise reduction, the data should preferably be replaced instantaneously in the FPN data buffers 210. According to the present invention, there are two groups of FPN data buffers. While the FPN data of pixels being read are being stored in the FPN data buffers 210, FPN data of pixels to be read next are successively loaded into the FPN data buffers 209. When signals from next pixels are to be read, the data stored in the FPN data buffers 209 are transferred to the FPN data buffers 210 by latch enable signals LE.

Output signals from the reading circuits 204 associated with the respective columns are held in sample and hold circuits in the respective reading circuits 204. Sampled and held output signals S/H from the respective columns are successively selected by the multiplexers 202, and outputted to an output terminal Out through a source follower 211. The horizontal shift register 201 is used to successively select the switches of the multiplexers 202 of the respective columns and also to successively select the FPN data buffers 209 of the respective columns. A data bus DFPM is connected to the FPN data buffers 209. If each of the $D_{FPN}$ correction regulated constant-current sources 203 of the respective columns is of a 3-bit structure, then the data bus $D_{FPN}$ comprises three lines.

Figure 6:
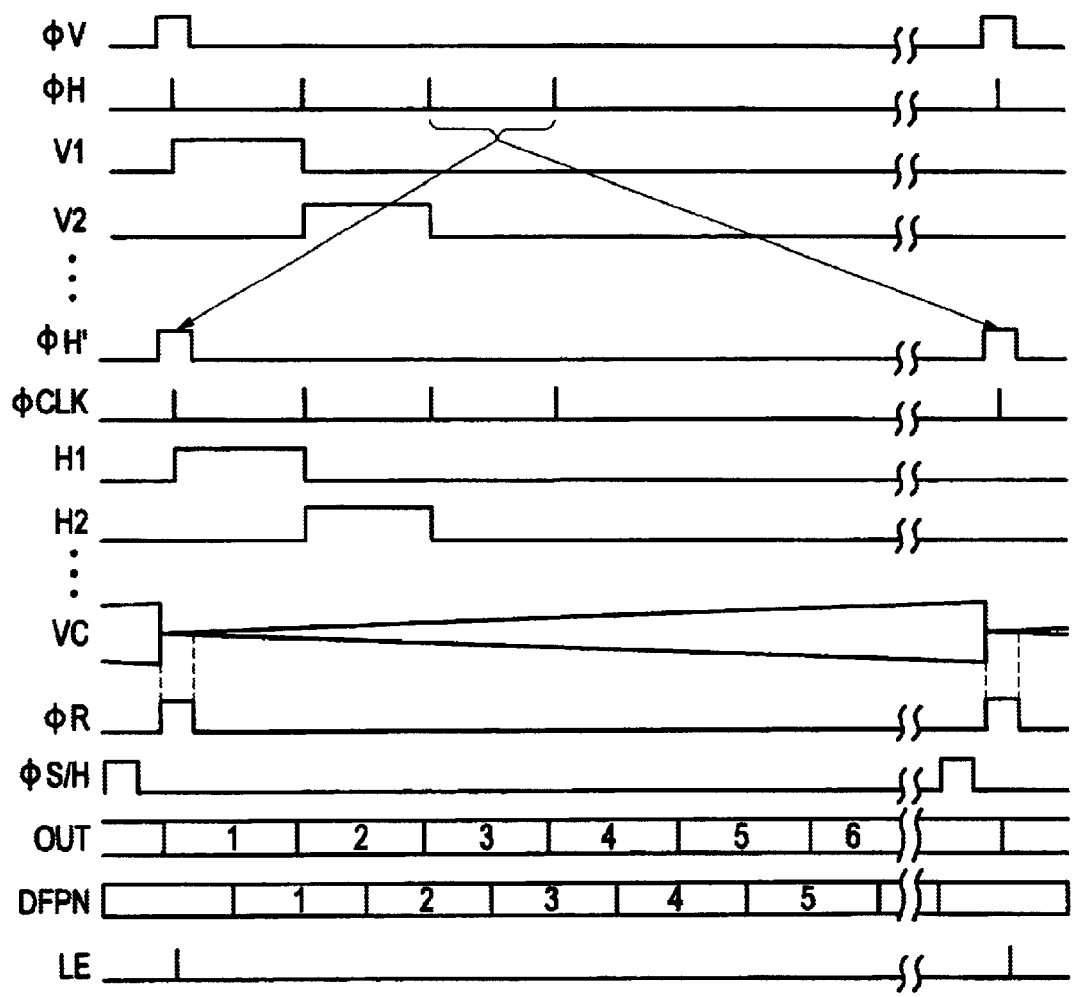
FIG. 6 is a timing chart showing the manner in which the imaging device shown in FIGS. 3A, 3B, and 5 operates.

FIG. 6 is a timing diagram of various signals in the imaging device shown in FIGS. 3A, 3B, and 5. A vertical synchronizing signal φV having a frequency of about 30 Hz is applied to a data terminal of the vertical shift register 206. A horizontal synchronizing signal φH' having a frequency of about 7 kHz is applied to a clock terminal of the vertical shift register 206. The vertical shift register 206 outputs vertical selection signals V1, V2, . . . to select the respective rows of the matrix.

While a certain row is being selected, the reading circuits of the respective columns effect a reading operation such as an integrating process. The voltage across the integrating capacitor 105 shown in FIG. 3A has a waveform (integrated waveform) VC. A sampling and holding pulse φS/H is applied to the sample and hold circuit to sample the integrated voltage and hold the sampled voltage in the holding capacitor. After the voltage is sampled, a reset pulse φR is applied to the reset switch 106 to reset the integrating capacitor 105.

When a horizontal synchronizing signal φH and a clock signal φCLK are applied respectively to data and clock terminals of the horizontal shift registers 201, the horizontal shift registers 201 outputs horizontal selection signals H1, H2, . . . to successively select the multiplexers 202 and the FPN data buffers 209.

The horizontal synchronizing signal φH' may be the same signed as φH. The signals held by the holding capacitors of the respective columns are outputted through the multiplexer 202 to the output terminal Out.

Before a certain row is read, FPN data is transferred over the data bus DFPN to the FPN data buffers 209. When rows are switched, the FPN data is transferred to and held in the FPN data buffers 210. The horizontal selection signals H1, H2, . . . are applied to respective write control terminals of the FPN data buffers 209, and the latch enable signal LE is applied to the data buffers 210.

Figure 7:
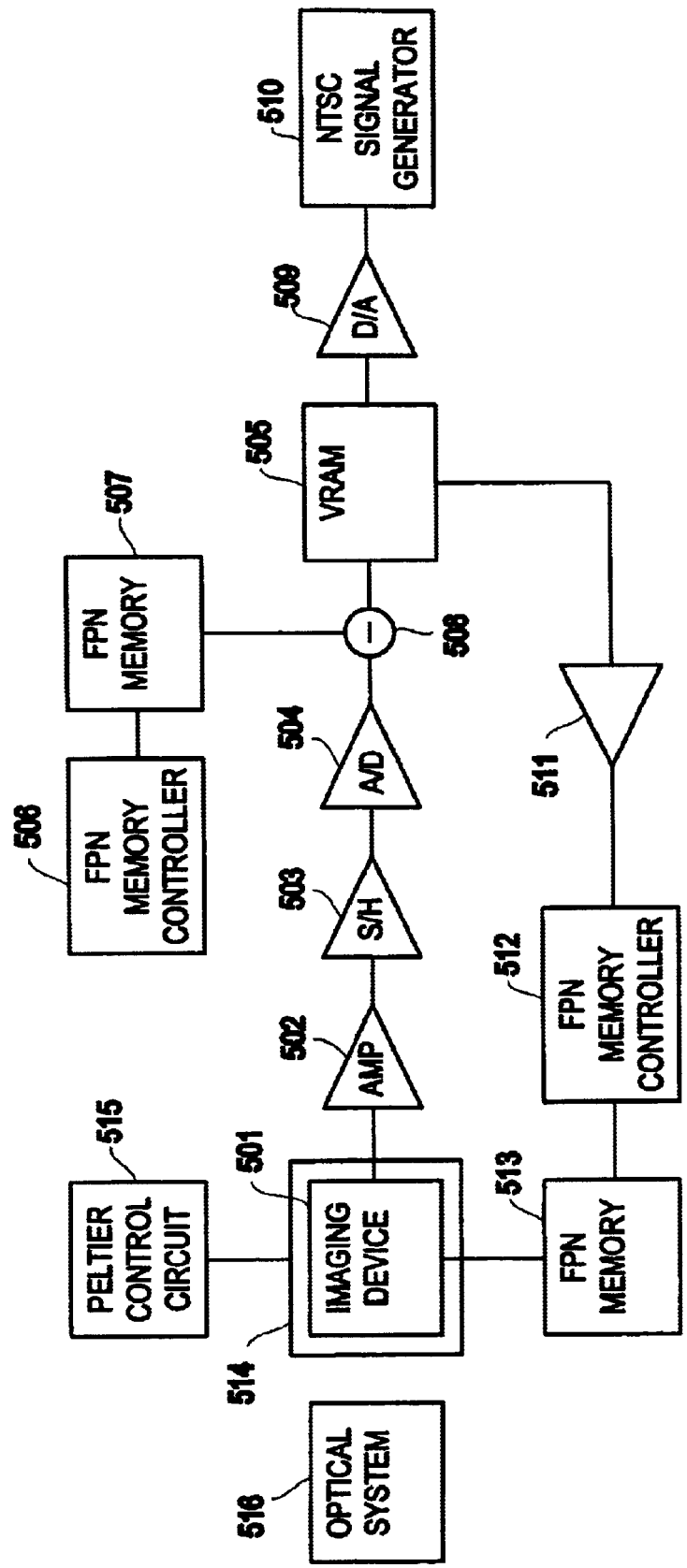
FIG. 7 is a block diagram of an imaging system according to the present invention.

FIG. 7 shows in block form an imaging system according to the present invention. As shown FIG. 7, the imaging system comprises an imaging device 501, an amplifier 502, a sample and hold circuit 503, an A/D converter 504, a VRAM 505, an FPN memory controller 506, an FPN memory 507, a digital subtractor 508, a D/A converter 509, an NTSC signal generator 510, a comparator 511, an FPN memory controller 512, and an FPN memory 513.

The imaging device 501 may be the imaging device shown in FIG. 4 which is fabricated on a single silicon substrate. Incident rays are focused by an optical system 516 onto the imaging device 501, which generates an electric signal depending on the applied incident rays. The electric signal is amplified by an integrating circuit and outputted from the imaging device 501. The output signal from the imaging device 501 is amplified by the amplifier 502, and the amplified signal is temporarily held by the sample and hold circuit 503. The signal held by the sample and hold circuit 503 is converted by the A/D converter 504 into a digital signal. If the output signal from the imaging device 501 is sufficiently high in level, the amplifier 502 may be dispensed with.

The number of bits of the A/D converter 504 for an infrared imaging system application is determined as follows: If the temperature resolution of a subject is 0.1° C. and the temperature of the dynamic range of the subject is 100° C., then 10 bits (about 1000 gradations) are required. Furthermore, if 2 bits (4 gradations) are assigned per minimum temperature resolution for reducing quantizing errors, then the A/D converter 504 needs a data interval of 12 bits.

The VRAM 505 is a memory for storing a 12-bit digital signal. If the imaging device 501 has 320×240 pixels, then the VRAM 505 may have a storage capacity of 320×240×12 bits. For managing bytes of data, the VRAM 505 may have a greater storage capacity of 320×240×16 bits, for example.

The FPN memory 507 is a memory for correcting variations that cannot be removed by an FPN correction process effected in the imaging device, as described later on. The FPN memory 507 stores variation data of the pixels for correction. The FPN memory controller 506 serves to control the FPN memory 507. The digital subtractor 508 serves to subtract variations of the pixels from signals that are supplied from the respective pixels on a real-time basis. The variation data of the pixels may be acquired according to the following sequence after FPN correction data in the imaging device is acquired.

Data of the pixels outputted from the A/D converter 504 while incident rays are being blocked by a shutter or the like contain variations that cannot be removed by the FPN correction in the imaging device. These data are stored in the FPN memory 507 when the imaging system is switched on or the previously corrected data are deviated from properly corrected data. In ordinary imaging events, the variation data stored in the FPN memory 507 are supplied to the digital subtractor 508, which subtract the variation data from signals that are supplied from the respective pixels on a real-time basis, for thereby generating variation-free signals.

The digital subtractor 508 may be replaced with an adder by generating complements of the data stored in the FPN memory 507. The digital subtractor 508 may be placed between the VRAM 505 and the D/A converter 509.

The D/A converter 509 converts the processed digital signal from the VRAM 505 into an analog signal, and supplies the analog signal to the NTSC signal generator 510. The NTSC signal generator 510 combines the supplied analog signal with synchronizing signals into an NTSC composite signal. The NTSC signal generator 510 may be replaced with a PAL signal generator or an RGB signal generator, as desired.

Correction data supplied to the FPN correction circuit (see FIG. 3B) in the imaging device 501 is acquired as follows: The comparator 511, which comprises a digital comparator, compares the signal levels of the pixels with a reference level. The reference level may be set to an upper or lower limit of the dynamic range of each of various signal processing circuits including the integrating circuit in the imaging device, the amplifier, the A/D converter, etc., or may be set to the sum of the upper or lower limit and a certain marginal level. The comparator 511 may judge signal levels higher than the reference level, signal levels lower than the reference level, or signal levels in a range between two reference levels, as acceptable.

The FPN memory controller 512 generates FPN correction data based on the result of the comparison made by the comparator 511. The generated FPN correction data is stored in the FPN memory 513. The FPN memory 513 may have a storage capacity represented by the product of the total number of pixels and the number of bits of the FPN correction data. For example, if the imaging device 501 has 320×240 pixels and the FPN correction data is of 3 bits, then the FPN memory 513 has a storage capacity of 320×240×3 bits. For managing bytes of data, the FPN memory 513 may have a greater storage capacity.

The imaging device 501 is kept at a constant temperature by a temperature stabilizing device 514 such as a Peltier device, which is controlled by a Peltier control circuit 515.

Figure 8:
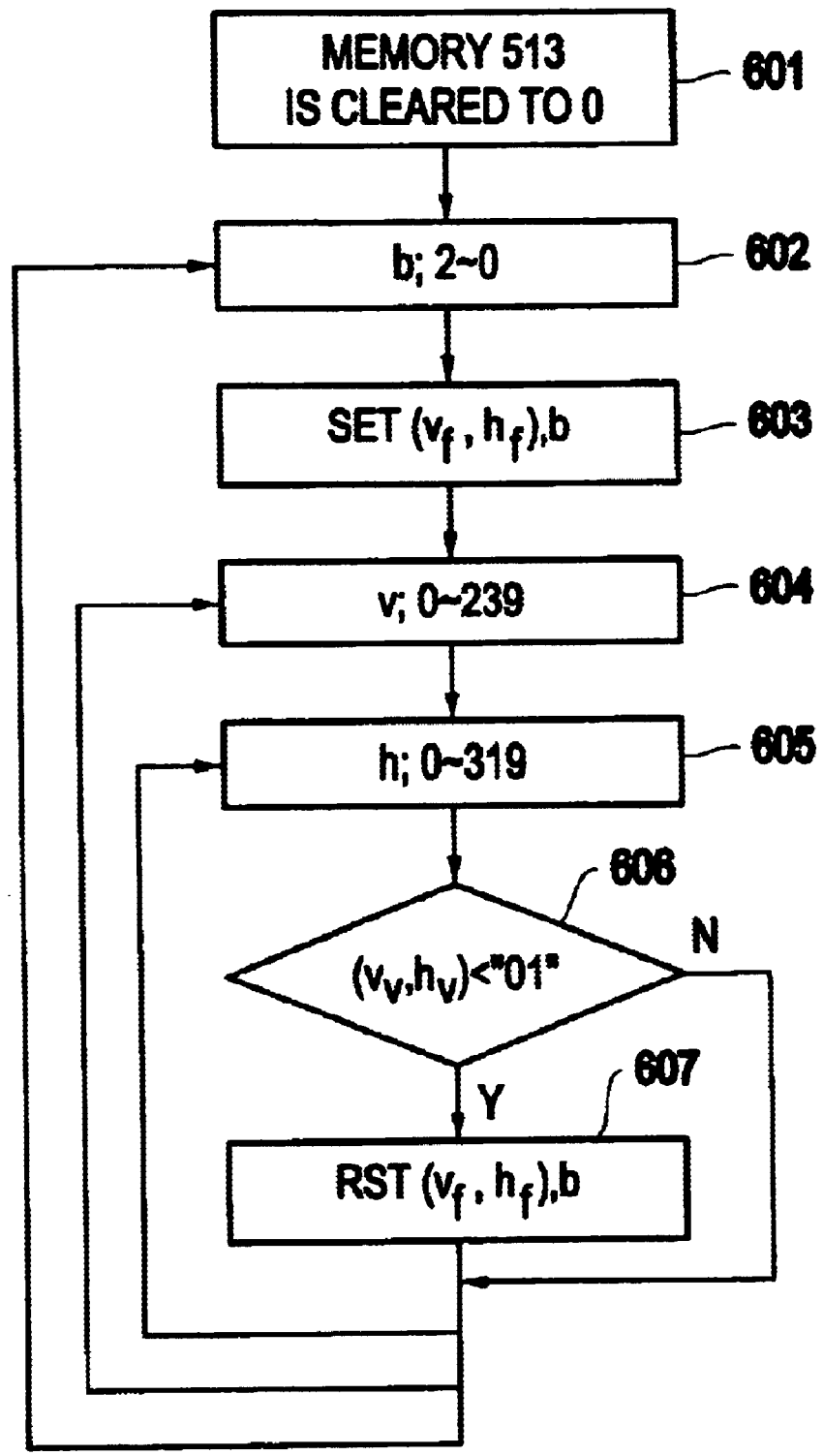
FIG. 8 is a flowchart of a process of generating FPN correction data.

FIG. 8 shows a process of generating the FPN correction data. It is assumed that the number of bits of the FPM correction data is 3. The process shown in FIG. 8 comprises a step 601 of clearing data of all addresses of the FPN memory 513, a step 602 of changing bit positions from most significant bit (MSB) to least significant bit (LSB), a step 603 of setting a bit b of all addresses of the FPN memory 513 to 1, an instruction step 604 for changing V addresses, an instruction step 605 of changing H addresses, a step 606 of making a conditional jump based on the decision made by the comparator 511, and a step 607 of resetting a bit b of a certain address of the FPN memory 513 to 0.

The process shown in FIG. 8 may be hardware-implemented by a logic IC or the like or software-implemented by a program run by a CPU or the like. If the process is hardware-implemented, then it can be carried out at high speed. If the process is software-implemented, then the program may be changed and functions may be added with great freedom.

In the step 601, all the bits of the FPM memory 513 whose storage capacity is of 320×240×3 bits are cleared to 0. This is because all bits need to be cleared when signal levels are subsequently to be judged by manipulating bits, one bit at a time, from an MSB to an LSB. Depending on the judging conditions, all the bits may be cleared to 1.

In the step 602, bits to be manipulated are successively changed from an MSB to an LSB in a loop as shown in FIG. 8. The bits to be manipulated may be selected by a selector such as a hardware circuit, or in a software-implemented loop.

In the step 603, a bit b of all addresses of the FPN memory 513 is set to 1. The bit b is a bit selected in the step 602. If an MSB, for example, is selected as the bit, then the data of all the addresses are represented by a binary number of 100. If a second bit is selected as the bit, then the data of all the addresses are represented by a binary number of *10 (* may be 0 or 1 depending on the judged result at the time the MSB is selected). If an LSB is selected as the bit, then the data of all the addresses are represented by a binary number of **1. In this manner, with an attentional bit being set to 1 and a bit lower in order than the attentional bit being set to 0, it is possible to decide whether the attentional bit is 0 or 1 by determining the signal level at the time.

In the step 604, V addresses are changed, and in the step 605, H addresses are changed. The steps 604, 605 are placed in loops shown in FIG. 8. Specifically, the V addresses are changed from 0 to 239, for example, in the step 604, and the H addresses are changed from 0 to 319, for example, in the step 605. The V and H addresses are successively changed for the processing in the steps 606, 607 for each of the pixels.

In the step 606, the subsequent processing is divided into two branches based on the result of the comparison made by the comparator 511. In this embodiment, the data of an attentional pixel in the VRAM 505 is determined by the digital comparator. If the data of the attentional pixel is smaller than a certain level, then it does not clear the lower limit of the dynamic range. This means that the bit b of this pixel is not 1 established in the step 603, but 0. If the data of the attentional pixel is smaller than the certain level in the step 606, then the bit b of an attentional pixel in the FPN memory 513 is set to 0 in the step 607. If the data of the attentional pixel is greater than the certain level in the step 606, then since the bit b may be 1, the step 607 is skipped.

Alternatively, the level of an analog signal from the imaging device may be compared with a certain level by an analog comparator. The certain level may be of a value that is greater than the upper limit of the dynamic range by a certain margin or a value that is smaller than the lower limit of the dynamic range by a certain margin. The margin is added to prevent the dynamic range from being unduly shifted due to temperature drifts or other drifts. The upper limit, the lower limit, or both of the dynamic range may be used depending on the design of the imaging system.

As described above, the loops including the steps 604, 605 for changing pixels to be manipulated are nested in the loop including the step 602 for changing bits to be manipulated. Usually, at least the time of one frame, e.g., 3.3 ms, is required to manipulate a certain bit and read the determined level thereof. According to the sequence shown in FIG. 8, for FPN correction of n bits, it is possible to acquire FPN data within the time of n frames, and hence the process can be completed in a very short period of time.

The FPN correction data in the imaging device may be generated once, either at the time of shipment of the imaging system, or upon inspection of the imaging system. Since the FPN correction process is a coarse correction process prior to the fine correction process effected outside of the imaging device, the FPN correction process may be much less frequent than the fine correction process effected outside of the imaging device. While the memory used to store the FPN correction data may be an SRAM, a DRAM, it should preferably be an EPROM which requires no backup power supply or an EEPROM. If the FPN correction data in the imaging device is generated once at the time of shipment of the imaging system, then the comparator 511 and the FPM memory controller 512 may be placed outside of the imaging system.

The circuit arrangement shown in FIGS. 3A and 3B may be constructed as an ordinary CMOS circuit by changing some bipolar transistors to field-effect transistors.

Figure 9A:
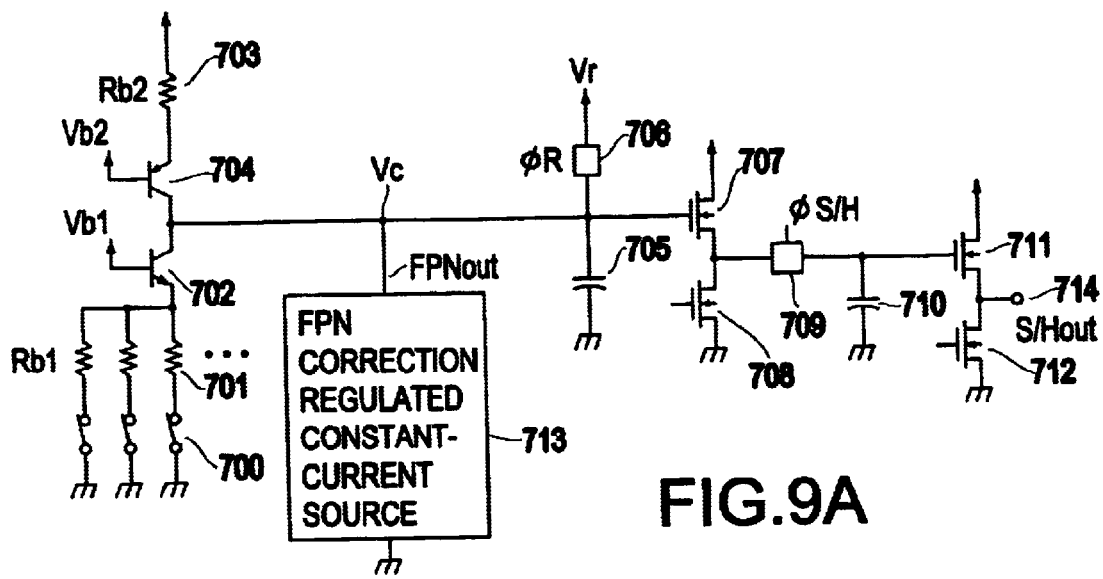
FIG. 9A is a circuit diagram of a reading circuit of an imaging device according to another embodiment of the present invention.
Figure 9B:
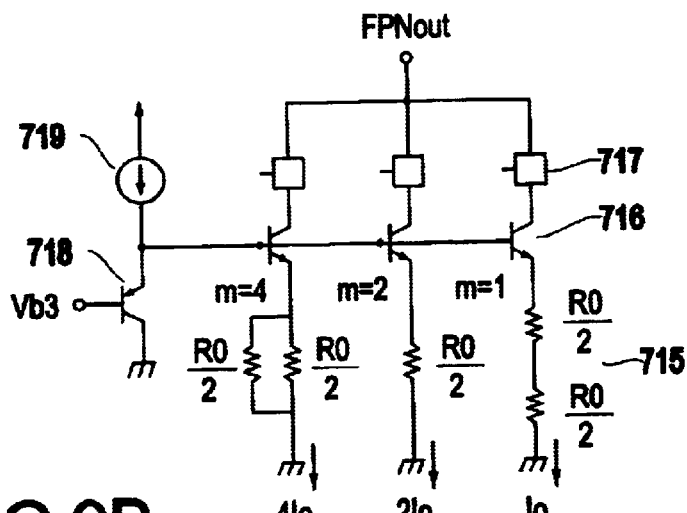
FIG. 9B is a circuit diagram of an FPN correction regulated constant-current source in the reading circuit shown in FIG. 9A.

FIG. 9A shows a reading circuit of an imaging device according to another embodiment of the present invention, which employs field-effect transistors, and FIG. 9B shows an FPN correction regulated constant-current source in the reading circuit shown in FIG. 9A.

The reading circuit shown in FIG. 9A includes an N-type field-effect transistor 702 and a P-type field-effect transistor 704. Other details and advantages of the reading circuit shown in FIG. 9A are the same as those of the reading circuit shown in FIG. 3A.

The FPN correction regulated constant-current source shown in FIG. 9B includes N-type field-effect transistors 716. Other details and advantages of the FPN correction regulated constant-current source shown in FIG. 9B are the same as those of the FPN correction regulated constant-current source shown in FIG. 3B. Those parts in FIGS. 9A and 9B which are indicated by reference numerals whose unit and tenth digits are identical to those shown in FIGS. 3A and 3B have the same functions as those parts shown in FIGS. 3A and 3B.

The field-effect transistors may comprise MOSFETS, JFETs, or embedded MOSFETs which do no use a semiconductor substrate surface as channels. Particularly, JFETs, and embedded MOSFETs are effective in reducing noise such as 1/f noise.

While preferred embodiments of the present invention have been described using specific terms, such description is for illustrative purposes only, and it is to be understood that changes and variations may be made without departing from the sprit or scope of the following claims.

What is claimed is:

1. An imaging device comprising:
 a plurality of detectors for converting an electromagnetic radiation into electric signals;
 a plurality of read circuits, each connected to at least one of said detectors, and including a first regulated constant-current source for supplying a constant bias current to said detectors, and a second regulated constant-current source connected to said first regulated constant-current source, for correcting variations inherent in said detectors.

2. An imaging device according to claim 1, wherein said reading circuit further includes a third regulated constant-current source connected to said first regulated constant-current source, for canceling said constant bias current.

3. An imaging device according to claim 1, wherein said first regulated constant-current source comprises a bipolar transistor having an emitter connected to said detectors and a collector connected to said second regulated constant-current source.

4. An imaging device according to claim 1, wherein said first regulated constant-current source comprises a field-effect transistor having a source connected to said detectors and a drain connected to said second regulated constant-current source.

5. An imaging device according to claim 1, wherein said second regulated constant-current source comprises a bipolar transistor and a resistor connected to an emitter of said bipolar transistor.

6. An imaging device according to claim 1, wherein said second regulated constant-current source comprises a field-effect transistor and a resistor connected to a source of said field-effect transistor.

7. An imaging device according to claim 5, wherein said resistor has a temperature coefficient which is the same as said detectors.

8. An imaging device according to claim 6, wherein said resistor has a temperature coefficient which is the same as said detectors.

9. An imaging device according to claim 1, wherein said second regulated constant-current source comprises a plurality of bipolar transistors and a plurality of resistors connected to emitters of said bipolar transistors, each of said resistors having a resistance inversely proportional to an area of the emitter of one of said bipolar transistors.

10. An imaging device according to claim 1, wherein said second regulated constant-current source comprises a plurality of field-effect transistors and a plurality of resistors connected to sources of said field-effect transistors, each of said resistors having a resistance inversely proportional to a gate length of one of said field-effect transistors.

11. An imaging device according to claim 5, wherein said resistance ranges from approximately 1 k$\Omega$ to 500 k$\Omega$.

12. An imaging device according to claim 6, wherein said resistance ranges from approximately 1 k$\Omega$ to 500 k$\Omega$.

13. An imaging device according to claim 9, wherein said resistance ranges from approximately 1 k$\Omega$ to 500 k$\Omega$.

14. An imaging device according to claim 10, wherein said resistance ranges from approximately 1 k$\Omega$ to 500 k$\Omega$.

15. An imaging device according to claim 1, further comprising two data buffers for storing variation data inherent in said detectors.

16. An imaging device according to claim 1, further comprising means for comparing signals from pixels of the detectors with an upper limit of a dynamic range of the reading circuit.

17. An imaging device according to claim 1, further comprising means for comparing signals from pixels of the detectors with a lower limit of a dynamic range of the reading circuit.

18. An imaging device according to claim 16, further comprising means for generating variation data inherent in said detectors based on the result of the comparison.

19. An imaging device according to claim 17, further comprising means for generating variation data inherent in said detectors based on the result of the comparison.

20. An imaging device according to claim 16, further comprising means for manipulating a most significant bit of each of the variation data inherent in said detectors to determine a value of the most significant bit based on the result of the comparison, and successively manipulating bits of the variation data of said detectors to determine values of the bits up to a least significant bit thereof.

21. An imaging device according to claim 17, further comprising means for manipulating a most significant bit of each of the variation data inherent in said detectors to determine a value of the most significant bit based on the result of the comparison, and successively manipulating bits of the variation data of said detectors to determine values of the bits up to a least significant bit thereof.

22. An imaging device comprising:

a plurality of detectors arranged in a two-dimensional matrix, for converting electromagnetic radiation into electric signals;

a plurality of switching means, each associated with said detectors, wherein each of said switching means selects at least one of said detectors;

a plurality of read-out circuits, each connected to said detectors in a column direction;

a plurality of regulated constant-current sources, each connected to one of the read-out circuits, for correcting variations inherent in said detectors;

a plurality of data buffers, each connected to said regulated constant-current sources, for storing data for fixed-pattern-noise correction to be supplied to said regulated constant-current sources;

a plurality of multiplexers, each associated with said read-out circuits, for selecting and outputting the output from the read-out circuits;

a vertical shift register for outputting vertical selection signals to successively turn on said switching means in a plurality of respective rows of the matrix; and a horizontal shift register for outputting horizontal selection signals to successively select said multiplexers.

23. An imaging device comprising:

a plurality of detectors for converting an electromagnetic radiation into electric signals;

a plurality of read circuits, each communicating with at least one of said detectors; and a plurality of constant-current sources, each correcting variations in at least one of said detectors.

24. The imaging device according to claim 23, further comprising:

a plurality of multiplexers, each associated with at least one of said plurality of read circuits, for outputting signals from said read-out circuits;

a vertical shift register for outputting vertical selection signals; and a horizontal shift register for outputting horizontal selection signals.

* * * * *